(12) United States Patent
Meinherz et al.

(10) Patent No.: US 9,025,019 B2
(45) Date of Patent: May 5, 2015

(54) TIME OF FLIGHT (TOF) SENSORS AS REPLACEMENT FOR STANDARD PHOTOELECTRIC SENSORS

(75) Inventors: Carl Meinherz, Malans (CH); Craig Martin Brockman, Windham, NH (US); Elik I. Fooks, Lexington, MA (US); Manfred Norbert Stein, Graubuenden (CH); Martin Hardegger, Sargans (CH); Wei Jie Chen, Westford, MA (US); Reto Berner, Aarau (CH); Richard Galera, Nashua, NH (US); Robert M. Black, Bolton, MA (US); Roger Merz, Richterswil (CH); Suresh Nair, Amherst, NH (US); Steven A. Eisenbrown, South Russell, OH (US)

(73) Assignees: Rockwell Automation Technologies, Inc., Mayfield Heights, OH (US); Cedes Safety & Automation AG, Landquart (CH)

( * ) Notice: Subject to any disclaimer, the term of this patent is extended or adjusted under 35 U.S.C. 154(b) by 417 days.

(21) Appl. No.: 12/906,622

(22) Filed: Oct. 18, 2010

(65) Prior Publication Data

US 2012/0092485 A1    Apr. 19, 2012

(51) Int. Cl.
*G01S 17/89*    (2006.01)
*F16P 3/14*    (2006.01)
*G01S 7/48*    (2006.01)

(52) U.S. Cl.
CPC ............... *G01S 17/89* (2013.01); *F16P 3/142* (2013.01); *G01S 7/4802* (2013.01)

(58) Field of Classification Search
None
See application file for complete search history.

(56) References Cited

U.S. PATENT DOCUMENTS

| | | | |
|---|---|---|---|
| 6,173,070 B1 * | 1/2001 | Michael et al. | 382/145 |
| 6,674,895 B2 * | 1/2004 | Rafii et al. | 382/154 |
| 7,319,777 B2 * | 1/2008 | Morcom | 382/104 |
| 7,460,691 B2 * | 12/2008 | Ng et al. | 382/107 |
| 7,545,949 B2 * | 6/2009 | Mirtich et al. | 382/100 |
| 7,599,516 B2 * | 10/2009 | Limer et al. | 382/100 |
| 8,223,215 B2 | 7/2012 | Oggier et al. | |
| 2005/0207619 A1 | 9/2005 | Lohmann | |

(Continued)

FOREIGN PATENT DOCUMENTS

| | | |
|---|---|---|
| CN | 101198964 A | 6/2008 |
| CN | 101600972 A | 12/2009 |

(Continued)

OTHER PUBLICATIONS

West, "High Speed, Real-Time Machine Vision", Integration and Automated Vision Systems, Inc., 2001, pp. 1-38.*

(Continued)

*Primary Examiner* — Jay Patel
*Assistant Examiner* — Reza Aghevli
(74) *Attorney, Agent, or Firm* — Amin, Turocy & Watson, LLP

(57) ABSTRACT

Systems and methods are provided for utilizing time of flight sensors in an industrial automation environment. The method includes employing a multi pixel camera associated with a time of flight sensor to detect an object located within a defined or bounded target area, comparing pixels with adjacent pixels associated with an image of the object captured by the multi pixel camera, identifying the object as being a colored, texture, or highly reflective object, and controlling industrial machinery based on the identification of the object entering the target area.

10 Claims, 12 Drawing Sheets

(56) References Cited

U.S. PATENT DOCUMENTS

2008/0186390 A1* 8/2008 Sato et al. .................. 348/222.1
2010/0177191 A1* 7/2010 Stier ............................... 348/92
2011/0317005 A1* 12/2011 Atkinson ...................... 348/135

FOREIGN PATENT DOCUMENTS

| DE | 10221578 | | 11/2003 |
|---|---|---|---|
| DE | 10221578 | A1 | 11/2003 |
| WO | 2009082822 | A1 | 7/2009 |
| WO | 2009097516 | A1 | 8/2009 |

OTHER PUBLICATIONS

Chinese Office Action mailed Mar. 4, 2014 for Chinese Patent Appliction 201110319371.2, 7 pages.

Chinese office action dated Nov. 15, 2014 for Chinese Patent Application No. 201110319371.2, 4 pages.

* cited by examiner

TIME OF FLIGHT (TOF) SENSORS AS REPLACEMENT FOR STANDARD PHOTOELECTRIC SENSORS

TECHNICAL FIELD

The claimed subject matter relates generally to industrial control systems and more particularly to systems and methods that employ time of flight sensing to effectuate functions typically performed by standard photoelectric sensors in industrial environments.

BACKGROUND

Standard photoelectric sensors have been utilized extensively in industrial applications. For example, photoelectric sensors have been utilized to raise and/or lower protective gates associated with industrial machinery moving and/or rotating with great rapidity and/or force to prevent the accidental or inadvertent ingress of fingers and/or limbs into these machines while they are operational.

Nevertheless, the performance of a standard photoelectric sensor can be highly dependent upon the color, reflectivity, and texture of the target to be sensed. A standard photoelectric sensor emits light that strikes a target. The amount of returned light must meet a set threshold to determine whether a target is present or not. Poor targets (e.g., dark in color, highly textured, shiny, etc.) may not return enough light to trigger the sensor's output.

A large percentage of photoelectric sensor applications utilize retro-reflective or polarized retro-reflective sensors. These sensors emit a modulated light source that strikes a reflector and returns the light back to a receiver. Anything that comes between the emitter and the reflector blocks the light beam between the emitter and the reflector, thus signaling the presence of the target.

Further, each pixel detected by a photoelectric sensor or image sensor can contain a data point. Accordingly, if there is an image with multiple data points, more than one pixel can influence evaluation of the image. In applications utilizing camera sensor technology, for instance, many image processing algorithms to evaluate images comprising multiple data points are known. Furthermore, in the field of camera sensor technology, where redundancy is a requirement (e.g., in safety systems), multiple cameras can be required.

In single pixel or single beam applications, like background suppression, there is typically only one pixel employed and it is generally not possible to use more than one pixel. Thus, in these applications a rail must be supplied and utilized, and it is not possible to compare more than one pixel. Further, in single pixel applications it can also be difficult to detect shiny objects. Moreover, in these systems there is no possibility to have redundancy without implementing a redundant path.

SUMMARY

The following summary presents a simplified overview to provide a basic understanding of certain aspects described herein. This summary is not an extensive overview nor is it intended to identify critical elements or delineate the scope of the aspects described herein. The sole purpose of this summary is to present some features in a simplified form as a prelude to a more detailed description presented later.

In accordance with various aspects and/or embodiments described and disclosed herein a method for utilizing a time of flight sensor in an industrial automation environment, is disclosed. The method includes employing a multi pixel camera, a single beam camera, or a single pixel camera, associated with a time of flight sensor to detect and/or capture an image of an object located within a target area, comparing a first pixel with adjacent pixels associated with the image of the object, identifying the object as being colored, textured, or highly reflective, and controlling or actuating industrial machinery to perform various tasks based on the identification of the object.

In accordance with further aspects and/or embodiments, a system that employs a time of flight sensor to control industrial automation machinery in an industrial automation environment is disclosed and described. The system can include a multi pixel camera, a single beam camera, or a single pixel camera associated with a time of flight sensor that captures images of objects that enter or exit a target area monitored by the multi pixel camera, single beam camera, or single pixel camera, and an industrial controller that compares a first pixel with one or more adjacent pixels associated with the captured images, and based at least in part on the comparison the industrial controller instructs the industrial automation machinery to perform one or more actions.

In accordance with yet further aspects and/or embodiments, a system that utilizes a time of flight sensor to control industrial automation machinery in an industrial automation environment is provided. The system can include means for employing a time of flight sensor to detect an object located within a target area, means for comparing a first pixel with adjacent pixels associated with an image of the object obtained by a means for capture associated with the time of flight sensor, means for identifying the object as a textured or dark colored object based at least in part on the comparison, and means for controlling industrial machinery based at least in part on the identification of the object.

To the accomplishment of the foregoing and related ends, the following description and annexed drawings set forth in detail certain illustrative aspects. These aspects are indicative of but a few of the various ways in which the principles described herein may be employed. Other advantages and novel features may become apparent from the following detailed description when considered in conjunction with the drawings.

DETAILED DESCRIPTION

Figure 1:
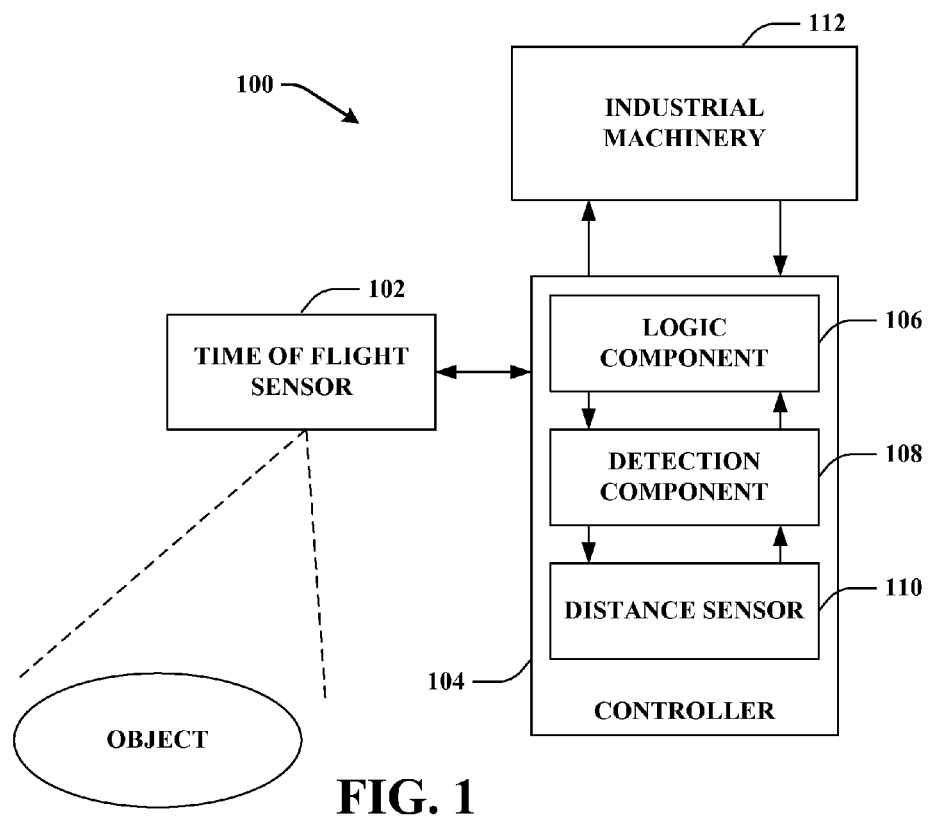
FIG. 1 is a schematic block diagram illustrating an industrial control system that utilizes a time of flight sensor in an industrial automation environment.

Referring initially to FIG. 1, an industrial control system 100 that utilizes a time of flight sensor in an industrial automation environment is illustrated. System 100 can include a time of flight sensor 102 that in conjunction with controller 104, logic component 106, detection component 108, and distance sensor 110 can monitor a prescribed target area for the entry and/or exit of objects into and/or out of the target area, and thereafter, on successful detection of the object, can control and/or activate/deactivate industrial machinery 112. It should be noted, without limitation or loss of generality, that while the components of system 100 (e.g., time of flight sensor 102, controller 104, logic component 106, detection component 108, and distance sensor 110) have been illustrated as distinct or separate entities for purposes of clarity of exposition, those with a comprehension of this field of endeavor will realize that some or all of the depicted components can be combined in one system or chip.

Heretofore, the task of monitoring target areas for entry or exit of objects into and/or out of target areas has been undertaken through utilization of photoelectric sensors. Photoelectric sensors however can be highly dependent upon the color, reflectivity, and/or texture of the sensed object. A standard photoelectric sensor typically emits light that strikes a target. The amount of returned light must meet a set threshold in order for a determination to be made as to whether or not the object is present in the target area. Thus, objects that enter into or exit from the target area that are dark in color, highly textured, or reflective (e.g., shiny) generally do not return sufficient light to trigger the photoelectric sensor's output.

Further, a large percentage of applications that employ photoelectric sensors utilize retro-reflective or polarized retro-reflective sensors, wherein a modulated light source strikes a reflector and returns the light back to a receiver. Anything that comes between the emitter and the reflector blocks the light beam between the emitter and the reflector, thus signaling the presence of an object.

Utilization of a time of flight sensor (e.g., time of flight sensor 102) can overcome these problems since time of flight technology is based on the amount of time it takes to emit a beam of light and receive light (no matter how attenuated) back to a receiver after the light strikes an object, rather than depending on light reflected off an object or whether or not an emitted beam of light has been interrupted due to the presence of an object.

In accordance with the foregoing therefore, time of flight sensor 102 can monitor and/or detect the presence of objects entering into and/or exiting from a target area. In an embodiment, the target area monitored by time of flight sensor 102 can be at least three meters or more. In a further embodiment, the detection limit of time of flight sensor 102 can be at least one meter or more or less than three meters. In another embodiment, the target area monitored by time of flight sensor 102 can be less than five millimeters and greater than two hundred and fifty meters. In a further embodiment, the target area monitored by time of flight sensor 102 can be less than a meter or can exceed two meters. In yet a further embodiment, the target area monitored by time of flight sensor 102 can exceed three meters or be less than one hundred meters. In still another embodiment, the detection limit of time of flight sensor 102 can be greater than one hundred meters or less than three hundred meters. As will clearly be comprehended by those ordinarily skilled in this field of endeavor, the detection limit of time of flight sensor 102 can encompass ranges of less than five millimeters and in excess of three hundred meters On perceiving the presence of objects entering into or exiting from a monitored target area, time of flight sensor 102 can communicate with controller 104. It should be appreciated without limitation or loss of generality that time of flight sensor 102, controller 104, logic component 106, detection component 108, distance sensor 110, and industrial machinery 112 can be situated at disparate ends of an industrial automation environment. For instance, in accordance with an embodiment, time of flight sensor 102 and industrial machinery 112 can be situated in close proximity with one another, while controller 104 and associated components (e.g., logic component 106, detection component 108, and distance sensor 110) can be located in one or more environmentally controlled (e.g., air-conditioned, dust free, etc.) environments. In accordance with a further embodiment, time of flight sensor 102, controller 104 and constituent components (e.g., logic component 106, detection component 108, and distance sensor 110) can be positioned in an environmentally controlled environment while industrial machinery 112 can be located in an environmentally inhospitable environment. In still yet another embodiment, time of flight sensor 102, controller 104, each of logic component 106, detection component 108, and distance sensor 110, and industrial machinery 112 can be located in geographically diverse ends of an industrial automation environment. Thus, in order to effectuate communication between these various and disparately located component parts a network topology or network infrastructure can be employed. Typically the network topology and/or network infrastructure can include any viable communication and/or broadcast technology, for example, wired and/or wireless modalities and/or technologies can be utilized to effectuate the subject application. Moreover, the network topology and/or network infrastructure can include utilization of Personal Area Networks (PANs), Local Area Networks (LANs), Campus Area Networks (CANs), Metropolitan Area Networks (MANs), extranets, intranets, the Internet, Wide Area Networks (WANs)—both centralized and/or distributed—and/or any combination, permutation, and/or aggregation thereof.

Time of flight sensor 102 can therefore communicate to controller 104 the presence of objects entering into and/or exiting from the target area. Controller 104 on receiving indication of the presence of objects entering into and/or exiting from the target area can utilize the facilities provided by logic component 106, detection component 108, and distance sensor 110 to ascertain the color, texture, and finish (e.g., reflectivity) of the objects, as well as the distance that the object is with respect to the time of flight sensor 102.

Logic component 106 in concert with detection component 108 and/or distance sensor 110 can facilitate detection of the color, texture, and finish associated with objects entering and/or leaving the target area, as well as establish whether or not objects have actually entered or left the target area or have merely skirted the periphery of the target area. In accordance with an embodiment, logic component 106 and detection component 108 can ascertain whether the object that entered into or exited from the target area is dark in color. In accordance with a further embodiment, logic component 106 and detection component 108 can establish the texture associated with the object that entered into or exited from the target area. In accordance with yet a further embodiment, logic component 106 and detection component 108 can ascertain whether or not the detected object that entered into or exited from the target area has a highly reflective surface. These determinations as to color, texture, and/or reflectivity of the detected object can be based at least in part on the amount of light that is returned from the object to a receiver associated with time of flight sensor 102.

In accordance with still yet a further embodiment, logic component 106 and distance sensor 110 can ascertain a distance that the object is from the time of flight sensor 102. Further, logic component 106 and distance sensor 110 can establish whether or not the object actually entered or exited the target area monitored by time of flight sensor 102, or whether the object approached a peripheral edge of the target area monitored by time of flight sensor 102. These determinations as to distance of the object from the time of flight sensor 102 can be based at least in part on the amount of time that it takes for a beam of light emitted by time of flight sensor 102 to be reflected back to a receiver associated with time of flight sensor 102 after the light strikes the object.

Once logic component 106 in concert with detection component 108 and/or distance sensor 110 has made evaluations as to the color, texture, reflectivity, and/or distance (or lack thereof) of the detected object, logic component 106 can actuate industrial machinery 112 based at least in part on the evaluations. Thus, for example, on detection of an object entering within the monitored target area, logic component 106 can direct industrial machinery 112 to enter into an immediate idle state. Conversely, on detection of an object exiting the target area, logic component 106 can instruct industrial machinery 112 to commence immediate operation.

Figure 2:
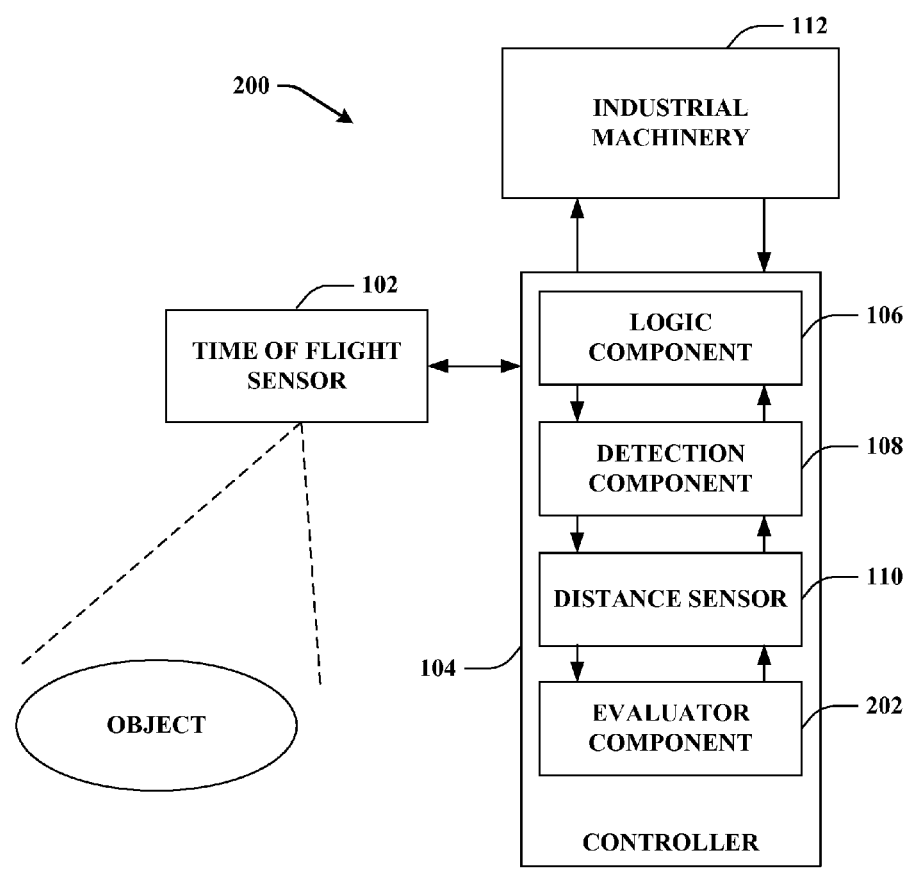
FIG. 2 is a further schematic block diagram depicting an industrial control system that employs a time of flight sensor in an industrial automation environment in accordance with an implementation of this disclosure.

With reference to FIG. 2, a further industrial control system 200 that utilizes a time of flight sensor in an industrial automation environment is depicted. In this embodiment, industrial control system 200, in addition to previously discussed, time of flight sensor 102, controller 104, logic component 106, detection component 108, and distance component 110, that individually or in combination control industrial machinery 112, can include evaluator component 202. Moreover, in this embodiment, time of flight sensor 102 can be coupled to a multi pixel camera (not shown) which can be directed or focused on the target area and that can provide multi pixel images of objects entering and/or exiting the monitored target area for analysis by controller 104 and subsequent performance of work by industrial machinery 112. Nonetheless, it should be noted without limitation or loss of generality that time of flight sensor 102 can itself be, or can include, a multi pixel camera that can be directed or focused on a target areas in order to provide multi pixel images (or three dimensional (3D) images) of objects entering and/or exiting the monitored target area. Additionally, it should also be noted, once again without limitation or loss of generality, that the multi pixel images or three dimensional images captured by time of flight sensor 102 (or a multi pixel camera associated with time of flight sensor 102) can be combined with other images from other non-three dimensional cameras for subsequent analysis and/or processing.

As stated above, time of flight sensor 102 in conjunction with a multi pixel camera can detect for the absence or presence of objects entering into or exiting from a defined target area and can provide to controller 104 (and its various associated and/or constituent components) an individual (or single) multi pixel image, a set of time staggered multi pixel images, or a continuous sequence of multi pixel images of objects entering into or exiting from the target area. Typically, once time of flight sensor 102 has perceived/observed entry or exit of objects into or out of the monitored target area, and multi pixel camera, in response to time of flight sensor's 102 observation, has captured an image, sets of images staggered over time, or a continuous sequence of images, the image, sets of time-lapsed images, or continuous sequence of images can be conveyed to controller 104, in particular evaluator component 202, for further analysis and/or processing.

It should be noted without limitation or loss of generality that time of flight sensor 102 in concert with a multi pixel camera is capable of detecting movement occurring within and outside (at the peripheral edge of the monitored target area). Further, time of flight sensor 102 together with multi pixel camera and controller 104 is also capable of facilitating background suppression sensing, wherein shiny or highly reflective objects entering or leaving the monitored target area and its general vicinity can be identified through the use of edge detection. Furthermore, time of flight sensor 102 in concert with multi pixel camera and controller 104 (or aspects thereof) can detect very small objects entering or leaving the monitored target area.

On receiving captured images, sets of time lapsed images, or continuous sequences of images, evaluator component 202 can evaluate more than one pixel associated with the image contemporaneously and/or sequentially. The evaluation can comprise performing inter pixel comparisons, wherein each pixel associated with the image (sets of time lapsed images or continuous sequences of images) is subject to a comparison with adjacent pixels, or pixels in adjacent areas of the image. In this manner gray scale can be accurately evaluated, and moreover distance information associated with the object ascertained.

Additionally, the evaluation executed by evaluator component 202 can be made with respect to a single image (comparing the single image with previously persisted images stored in data storage), sets of time lapsed images (where a comparison can be made between each individual image included in the sets of time lapsed images, or between the individual images included in the sets of time lapsed images and reference images stored in a data store), or sequences of streamed images (where a comparison can be made between each image in the stream and other images in the stream, or between images included in the stream of images and previously stored streams of images retrieved from a database).

Moreover, evaluator component 202 can also perform difference analysis on the received image, sets of time lapsed images, or sequences of images received in a constant stream, wherein pixel differences between the received image, sets of time lapsed images, or sequences of images received in a constant stream and other images subsequently or previously received, persisted, or streamed can be undertaken. In this manner background suppression sensing through edge detection can be facilitated without the necessity of a rail.

On completion of the various analyses performed by evaluator component 202, logic component 106 can instruct or command industrial machinery 112 to perform or desist from performing various actions. For example, where a highly reflective, textured, or dark colored object is detected as having entered into the target area monitored by time of flight sensor 102 in conjunction with a multi pixel camera, logic component 106 can instigate industrial machinery 112 to raise or lower safety gates associated with industrial machinery 112, and instantly power off industrial machinery 112. In a further example, where a highly reflective, textured, or dark colored object is identified as having entered into the target area, logic component 106 can direct one set of industrial machinery 112 to power up to receive the detected object and another set of industrial machinery 112 to power down after having transitioned the detected object to the first set of industrial machinery 112.

It should be noted that the disclosure identifies and/or utilizes data storage devices, persistence devices, or storage media to persist images, sets of time lapsed images, and/or streams of images. While these persistence devices (e.g., memory, storage media, and the like) are not depicted, typical examples of these devices include computer readable media including, but not limited to, an ASIC (application specific integrated circuit), CD (compact disc), DVD (digital video disk), read only memory (ROM), random access memory (RAM), programmable ROM (PROM), floppy disk, hard disk, EEPROM (electrically erasable programmable read only memory), memory stick, and the like.

It is noted that components associated with the industrial control systems 100 and 200 can include various computer or network components such as servers, clients, controllers, industrial controllers, programmable logic controllers (PLCs), energy monitors, batch controllers or servers, distributed control systems (DCS), communications modules, mobile computers, wireless components, control components and so forth that are capable of interacting across a network. Similarly, the term controller or PLC as used herein can include functionality that can be shared across multiple components, systems, or networks. For example, one or more controllers can communicate and cooperate with various network devices across the network. This can include substantially any type of control, communications module, computer, I/O device, sensors, Human Machine Interface (HMI) that communicate via the network that includes control, automation, or public networks. The controller can also communicate to and control various other devices such as Input/Output modules including Analog, Digital, Programmed/Intelligent I/O modules, other programmable controllers, communications modules, sensors, output devices, and the like.

The network can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (hardware or software components). These include components such as switches with virtual local area network (VLAN) capability, LANs, WANs, proxies, gateways, routers, firewalls, virtual private network (VPN) devices, servers, clients, computers, configuration tools, monitoring tools, or other devices.

Figure 3:
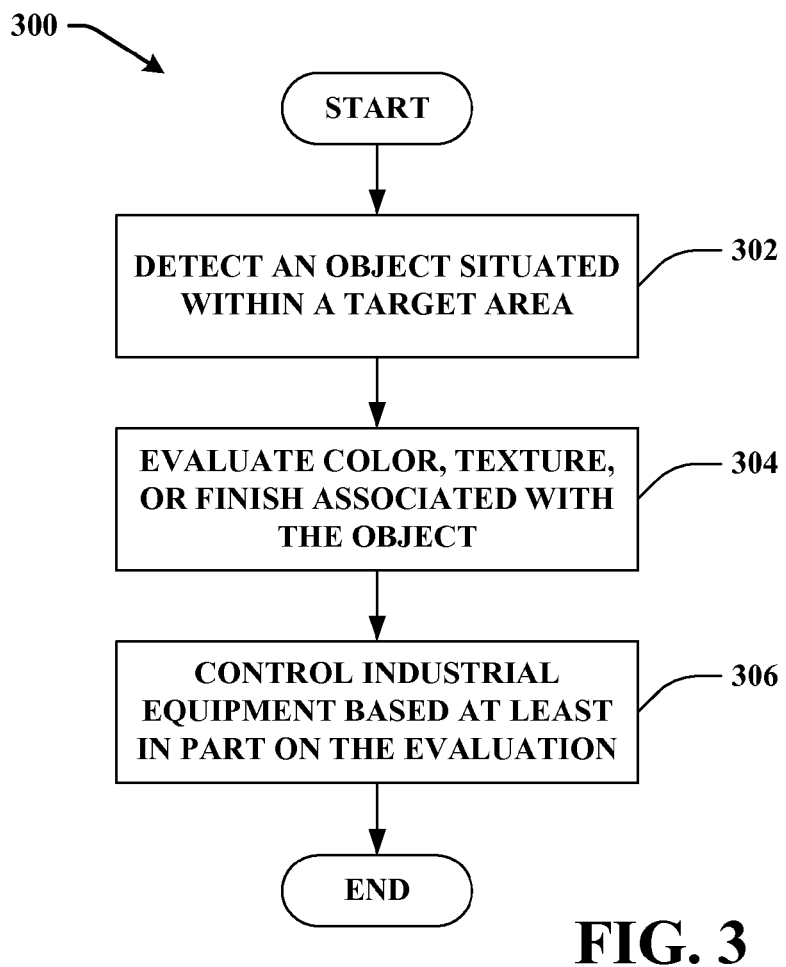
FIG. 3 is a flow diagram illustrating a process for utilizing a time of flight sensor to control industrial machinery or equipment in an industrial automation environment in accordance with an implementation of this disclosure.
Figure 4:
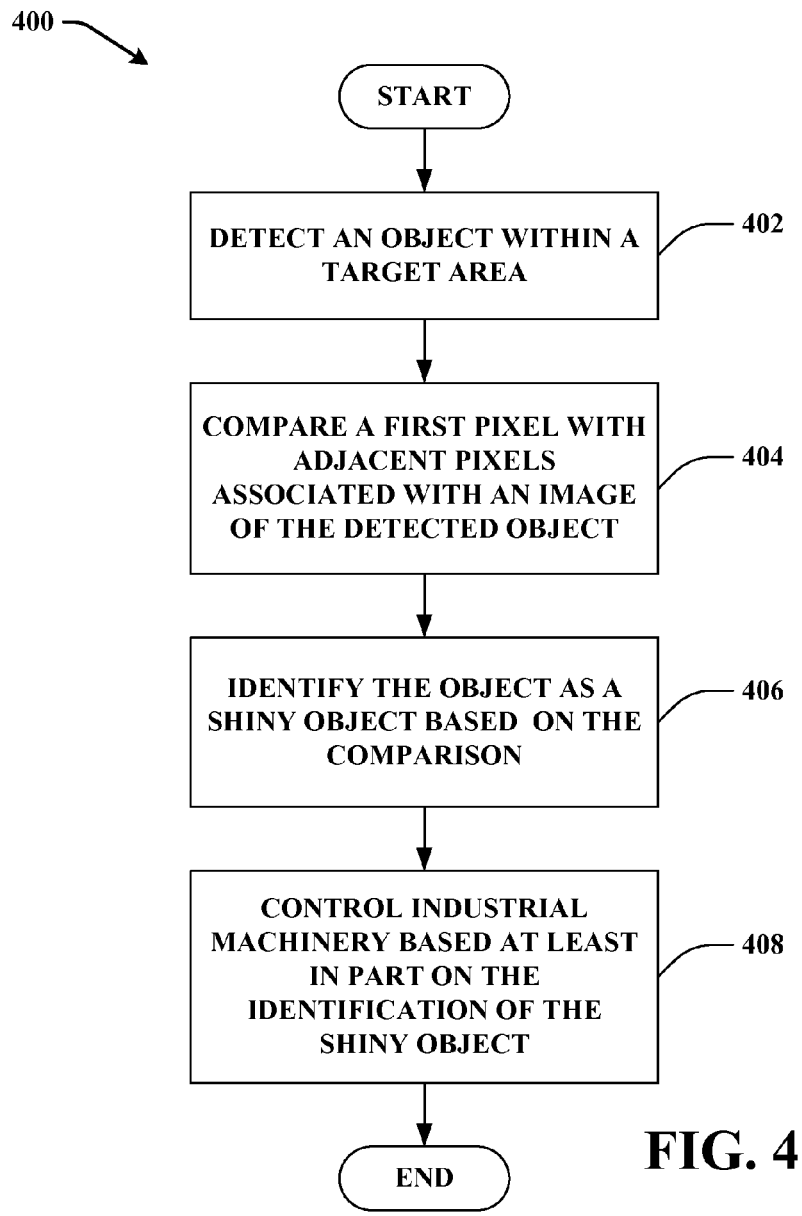
FIG. 4 is a further flow diagram illustrating a process employing a time of flight sensor to control industrial machinery or equipment in an industrial automation environment in accordance with an implementation of this disclosure.

FIG. 3 is a flow diagram 400 illustrating a process for utilizing a time of flight sensor to control industrial machinery or equipment in an industrial automation environment. FIG. 4 which is described below represents a further methodology or process for employing a time of flight sensor to control industrial machinery or equipment in an industrial automation environment. While, for purposes of simplicity of explanation, the methodologies are shown and described as a series of acts, it is to be understood and appreciated that the methodologies are not limited by the order of acts, as some acts may occur in different orders or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as described herein.

The techniques and processes described herein may be implemented by various means. For example, these techniques may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors.

FIG. 3 is a flow diagram illustrating a process 300 for utilizing a time of flight sensor to control industrial machinery or equipment in an industrial automation environment. Process 300 can commence at 302 wherein the presence (or lack thereof) of an object within a target area can be detected. At 304 where an object is detected as being present in the target area, an evaluation can be performed in order to determine the color, texture, or finish (e.g. reflectivity) of the object. At 306, based at least in part on the evaluation various and disparate industrial equipment can be controlled or instigated to perform (or desist from performing) various tasks such as transitioning to various states (e.g., powering on/off, accelerating/decelerating, becoming idle, etc.).

FIG. 4 is a flow diagram illustrating a process 400 for employing a time of flight sensor to control industrial machinery or equipment in an industrial automation environment. Process 400 can commence at 402 wherein the presence of an object entering or exiting a defined or bounded target area can be detected. At 404 where an object is detected as having entered or exited the defined or bounded target area an image captured of the object entering or exiting the defined or bounded target area can be compared wherein a first pixel of the image can be compared with adjacent pixels of the image. This comparison can form the basis of an edge detection wherein the inter pixel comparison locates edges of the detected object. At 406 based at least in part on the foregoing comparison, the object can be identified as being highly reflective (e.g., shiny). At 408 based at least in part on the foregoing identification of the object being highly reflective, industrial machinery can be actuated or controlled to perform one or more actions.

Figure 5:
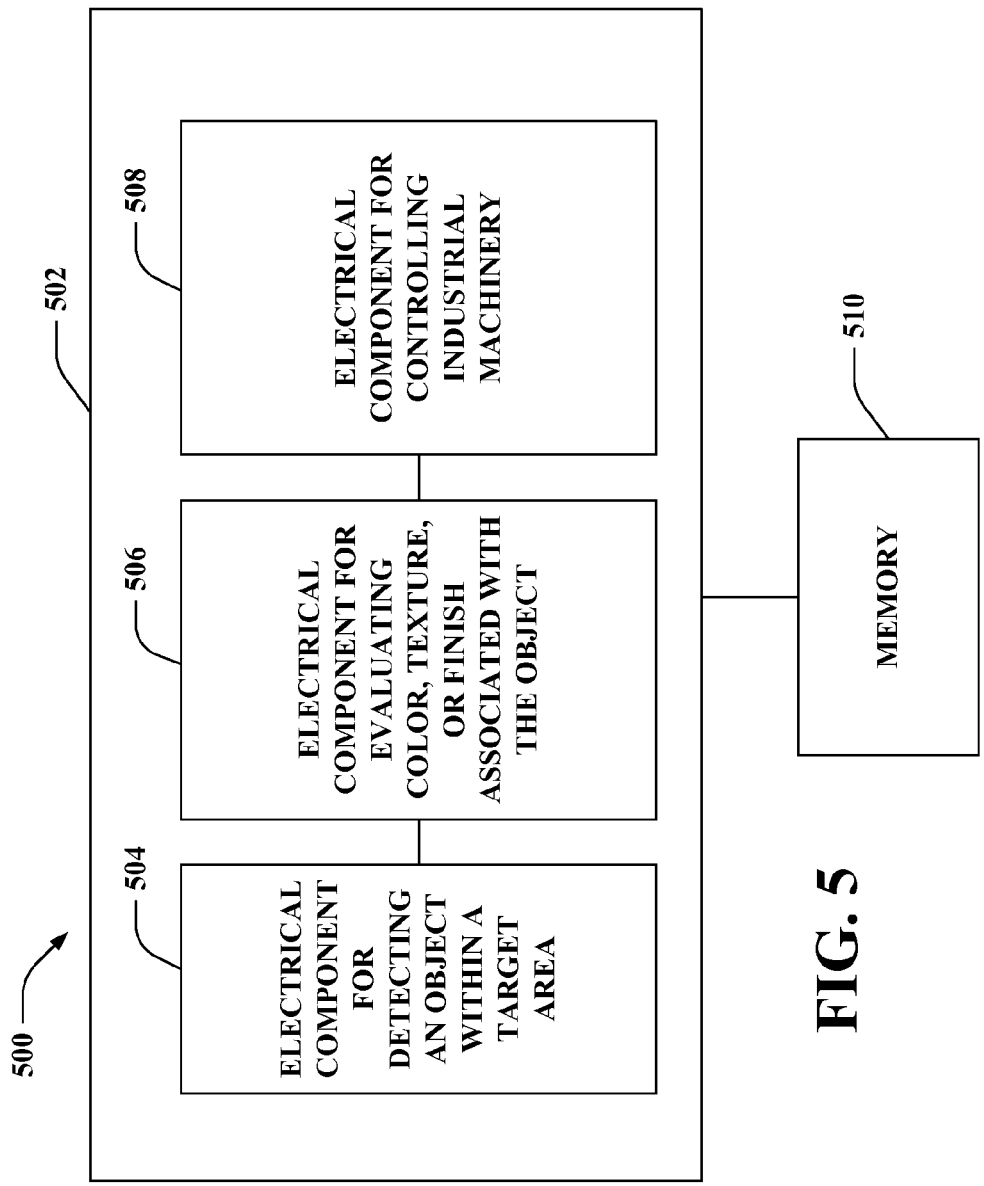
FIG. 5 is an example system that employs a time of flight sensor to control industrial machinery or equipment in an industrial automation environment in accordance with an implementation of this disclosure.

Turning to FIG. 5, illustrated is a system 500 that includes functional blocks that can represent functions implemented by a controller, processor, software, or combination thereof (e.g., firmware). System 500 includes a logical grouping 502 of electrical components that can act in conjunction. Logical grouping 502 can include an electrical component for detecting an object within a target area 504. Further, logical grouping 502 can include an electrical component for evaluating color, texture, or finish associated with the object 506. Moreover, logical grouping 502 can include an electrical component for controlling industrial machinery 508. Additionally, system 500 can include a memory 510 that retains instructions for executing functions associated with electrical components 504, 506, and 508. While shown as being external to memory 510, it is to be understood that electrical components 504, 506, and 508, can exist within memory 510.

As will be appreciated by those of moderate comprehension in this field of endeavor, the logical grouping 502 of electrical components can in accordance with an embodiment be a means for performing various actions. Accordingly, logical grouping 502 of electrical components can comprise means for detecting an object within a target area 504. Additionally, logical grouping 502 can further comprise means for evaluating color, texture, or finish associated with the object 506. Moreover, logical grouping 502 can also include means for controlling industrial machinery 508.

Figure 6:
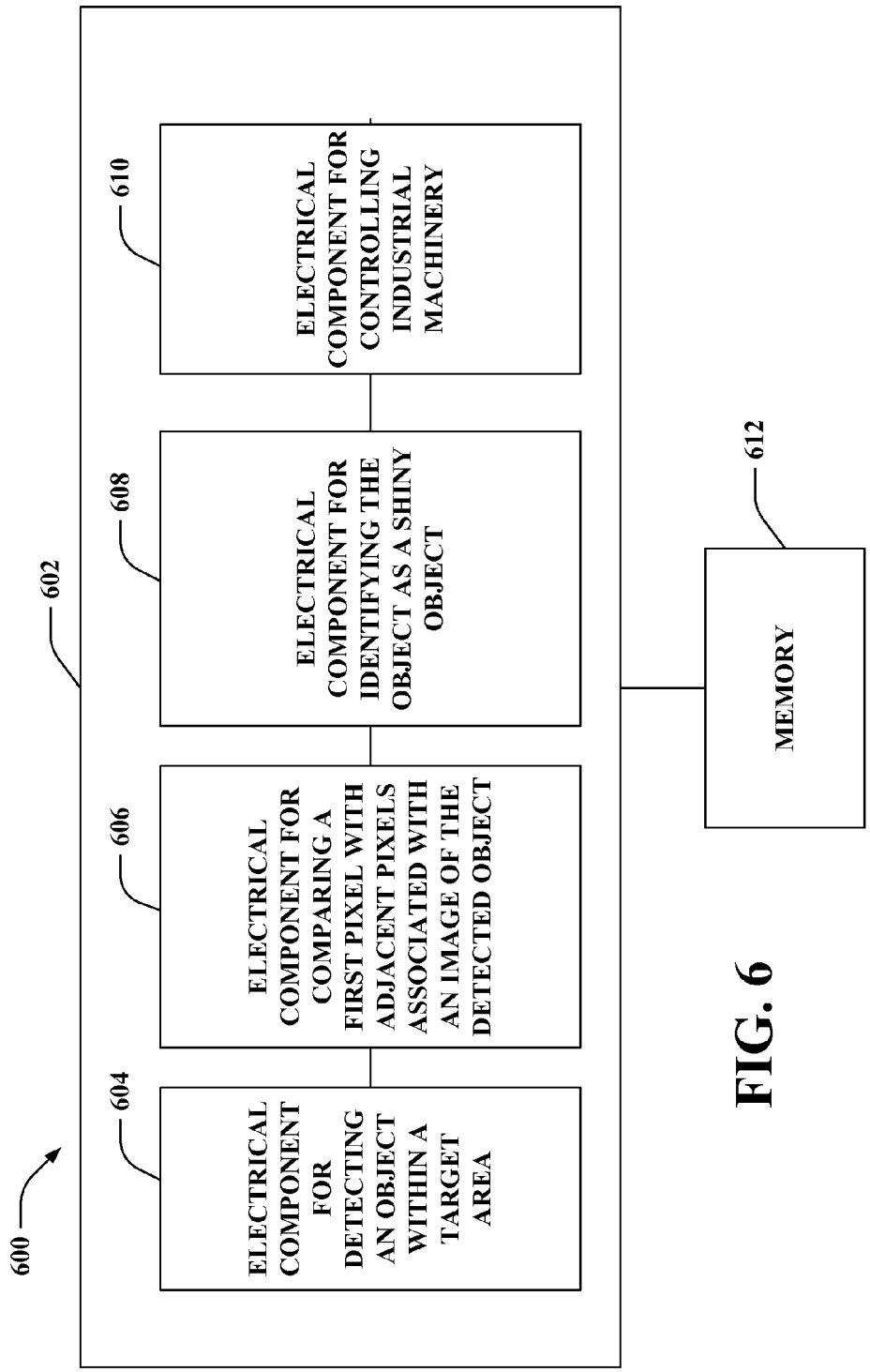
FIG. 6 is a further example system that utilizing a time of flight sensor to control industrial machinery or equipment in an industrial automation environment in accordance with an implementation of this disclosure.

Turning to FIG. 6, illustrated is a system 600 that includes functional blocks that can represent functions implemented by a controller, processor, software, or combination thereof (e.g., firmware). System 600 includes a logical grouping 602 of electrical components that can act in conjunction. Logical grouping 602 can include an electrical component for detecting an object within a target area 604. Further, logical grouping 602 can include an electrical component for comparing a first pixel with adjacent pixels associated with an image of the detected object 606. Moreover, logical grouping 602 can include an electrical component for identifying the object as a shiny object 608. Furthermore, logical grouping 602 can include an electrical component for controlling industrial machinery 610. Additionally, system 600 can include a memory 612 that retains instructions for executing functions associated with electrical components 604, 606, 608, and 610. While shown as being external to memory 612, it is to be understood that electrical components 604, 606, 608, and 610 can exist within memory 612.

Once again as will be comprehended by those of reasonable skill, logical grouping 602 of electrical components that can, in accordance with various embodiments, act as a means for accomplishing various actions or tasks. Thus, logical grouping 602 can include means for detecting an object within a target area 604. Further, logical grouping 702 can include means for comparing a first pixel with adjacent pixels associated with an image of the detected object 606. Moreover, logical grouping 602 can include means for identifying the object as a shiny object 608. Furthermore, logical grouping 602 can include means for controlling industrial machinery 610.

The techniques and processes described herein may be implemented by various means. For example, these techniques may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors.

Figure 7:
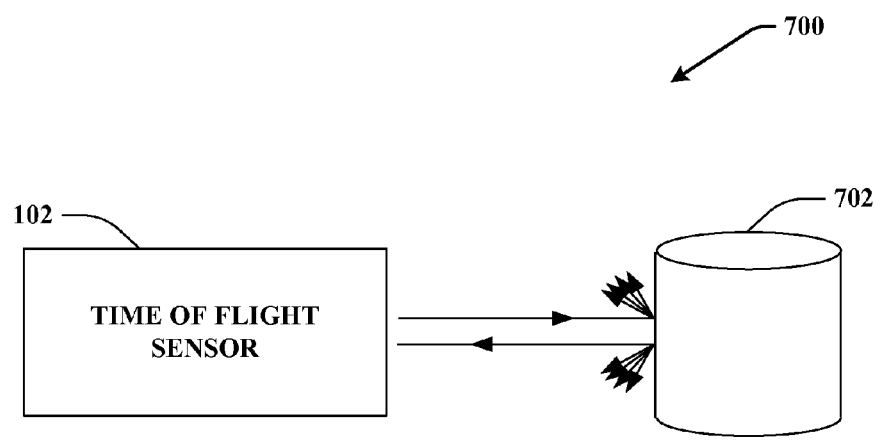
FIG. 7 is a schematic block diagram of a time of flight sensor utilized in an industrial automation environment in accordance with an implementation of this disclosure.

FIG. 7 provides a schematic block diagram 700 of a time of flight sensor 102 that can be employed in an industrial automation environment. As illustrated, time of flight sensor 102 can be employed to detect the absence or presence of a three dimensional object 702. In accordance with an embodiment, three dimensional object 702 can have a surface that is highly reflective (shiny) and that returns most emitted light directed from time of flight sensor 102 to three dimensional object 702 in a widely diffuse manner. In a further embodiment, three dimensional object 702 can have a surface that is very dark or a highly textured (e.g., matte) surface in which case three dimensional object 702 can absorb most light emitted by time of flight sensor 102 reflecting very little back for detection. As will be appreciated by those of moderate understanding in this field of endeavor, detection and/or monitoring of three dimensional objects (e.g., three dimensional object 702) with such characteristics can be challenging for the most part. To overcome these short comings therefore, time of flight sensor 102, that can be associated with or incorporate a single pixel camera or a multi pixel camera, can emit a single pixel or single beam of visible or infrared light towards three dimensional object 702. Three dimensional object 702 reflects or returns the emitted single pixel or single beam of light (or, depending on the color, reflectiveness, or texture of three dimensional object 702, a much attenuated single pixel or single beam of light) back towards time of flight sensor 102. The time that it takes for the transmitted wave of light to propagate to and return from three dimensional object 702 provides indication as to the distance that three dimensional object 702 is positioned from time of flight sensor 102. Additionally, the degree of attenuation in the returned wave of light can also provide indication of: how shiny (reflective) three dimensional object 702 is, the color that three dimensional object 702 is; and/or the textural surface of three dimensional object 702.

In accordance with an embodiment, time of flight sensor 102 on emitting a single pixel beam can detect or sense three dimensional object 702 when three dimensional object 702 is positioned proximate to reflective backgrounds. Time of flight sensor 102 can accomplish detection of three dimensional object 702 in such situations by use of edge detection and/or inter pixel comparisons between a pixel at issue and surrounding or adjacent pixels previously and/or subsequently obtained. Through the facilities of edge detection and/or inter pixel comparisons, reflective backgrounds, that might otherwise have made detection of a three dimensional object 702 situated proximate to these backgrounds difficult, can be identified, and if necessary suppressed, thereby making detection of three dimensional object 702 easier.

In accordance with a further embodiment, time of flight sensor 102 on emitting a single pixel beam directed towards three dimensional object 702 can detect and/or monitor three dimensional object 702 without the necessity of a background. Time of flight sensor 102 can ascertain the presence (or absence) of three dimensional object 702 through edge detection and/or utilization of inter pixel comparison, where a pixel of light (from the emitted single pixel beam) returned from or reflected off three dimensional object 702 is compared with single pixels of light previously or subsequently reflected or returned from three dimensional object 702. In this manner, time or flight sensor 102 can ascertain the presence of three dimensional object 702 within a target area without the necessity of a background. Additionally, time of flight sensor 102 can determined whether or not three dimensional object 702 has a reflective surface, a textured surface, and/or a colored surface. This latter facility can be provided by the degree of attenuation of light returned from three dimensional object 702. Thus, for example, where there is a significant degree of attenuation of returned light, time of flight sensor 102 can conclude that the detected three dimensional object is highly textured or is dark in color.

In yet a further embodiment, time of flight sensor 102 can be utilized to ascertain whether or not three dimensional object 702 has certain dimensions. In accordance with this aspect, time of flight sensor 102 can direct a beam of light a single pixel wide towards three dimensional object 702, and once again through use of edge detection modalities and/or inter pixel comparisons, wherein a returned or reflected pixel at issue and previously and/or subsequently returned or reflected pixels of adjacent areas of three dimensional object 702 are compared with one another, can ascertain whether or not three dimensional object 702 satisfies critical dimensions. Thus, time of flight sensor 102 (in conjunction with other components discussed supra) can detect three dimensional objects with both very small dimensions as well as three dimensional objects of more significant magnitude.

Figure 8:
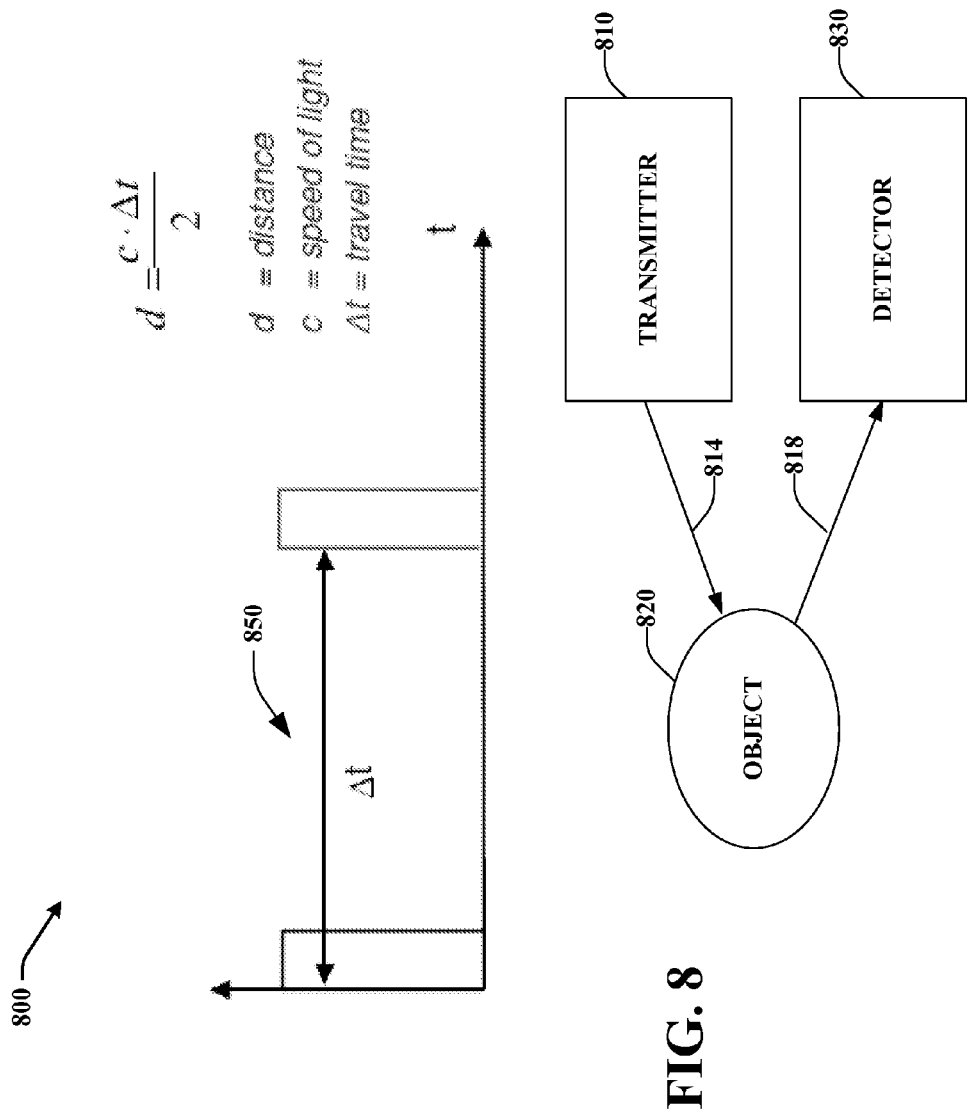
FIGS. 8-10 illustrate example time of flight sensor concepts in accordance with an implementation of this disclosure.
Figure 9:
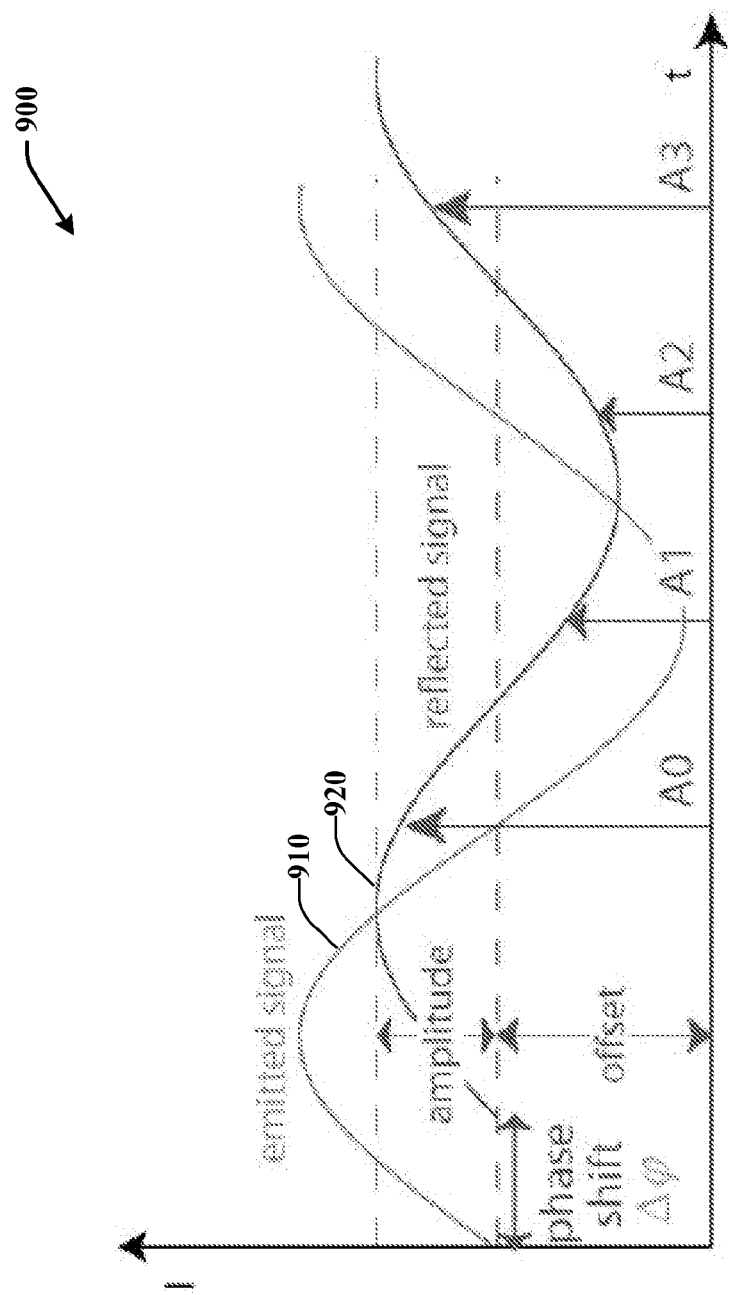
Figure 10:
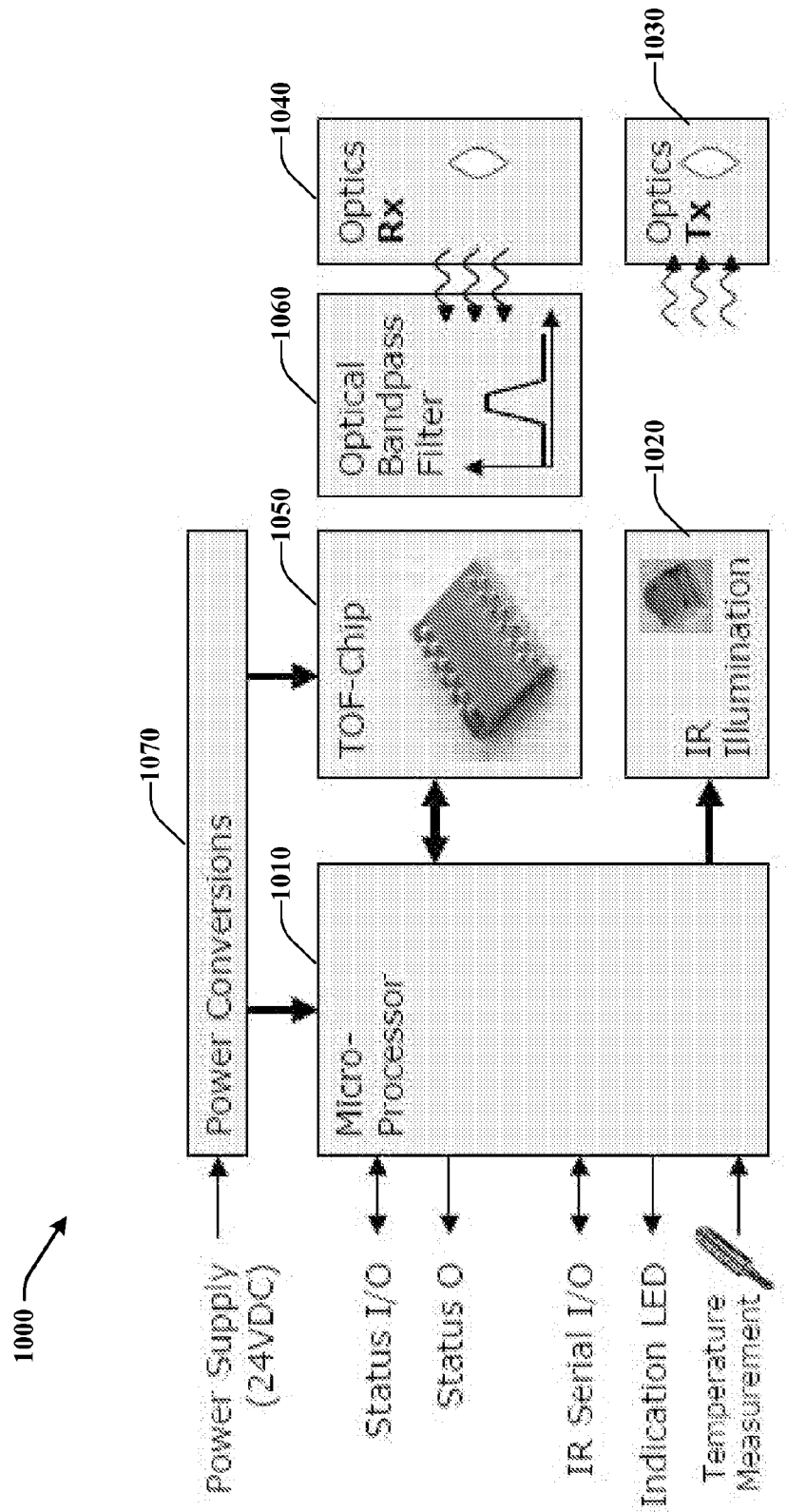

FIGS. 8-10 are discussed collectively and illustrate example time of flight sensor concepts. At 810 of FIG. 8, a transmitter generates an infrared beam 814 that is reflected at 818 from an object 820, where the reflection is received at a detector 830. The time it takes for the transmitted wave 814 to be received at the detector 818 is shown at diagram 850 that represents delta t. In general, the object distance d can be detected from the equation $d=(c*\Delta t)/2$, where d equals the object distance, c equals the speed of light, and $\Delta t$ equals the light travel time from transmitter 810 to detector 820. It is to be appreciated that other types of TOF measurements are possible as will be described in more detail below.

Proceeding to FIG. 9, a diagram 900 illustrates a phase shift between an emitted or transmitted signal and a received or reflected signal 920. In general, parameters of phase shift shown as A0, A1, A2, and A3 are employed to compute distance of the respective object shown at 820 of FIG. 8. In general, object distance is basically proportional to the detected phase shift, basically independent of background illumination, and basically independent of reflective characteristics of the objects.

Proceeding to FIG. 10, an example circuit 1000 is illustrated for computing object distances and speeds. A microprocessor 1010 generates infrared (IR) and/or visible illumination at 1020 that is transmitted toward an object via transmitting optics 1030. Reflections from the object are collected via receiving optics 1040 that can in turn be processed via an optical bandpass filter 1060. A time of flight (TOF) chip 1050 can be employed to compute phase shifts and store distance or other data such as color or image data. Output from the TOF chip 1050 can be passed to the microprocessor 1010 for further processing. In the present application, the microprocessor can identify and detect the presence of an object within a defined and/or bounded target area monitored by the TOF chip 1060. As shown, a power supply 1070 can be provided to generate different operating voltages for the microprocessor 1010 and the TOF chip 1050, respectively.

It is noted that as used herein, that various forms of Time of Flight (TOF) sensors can be employed to control industrial equipment in the performance of various industrial activities based on the presence and/or absence of an object within a target areas as described herein. These include a variety of methods that measure the time that it takes for an object, particle or acoustic, electromagnetic or other wave to travel a distance through a medium. This measurement can be used for a time standard (such as an atomic fountain), as a way to measure velocity or path length through a given medium, or as a manner in which to learn about the particle or medium (such as composition or flow rate). The traveling object may be detected directly (e.g., ion detector in mass spectrometry) or indirectly (e.g., light scattered from an object in laser Doppler velocimetry).

In time-of-flight mass spectrometry, ions are accelerated by an electrical field to the same kinetic energy with the velocity of the ion depending on the mass-to-charge ratio. Thus the time-of-flight is used to measure velocity, from which the mass-to-charge ratio can be determined. The time-of-flight of electrons is used to measure their kinetic energy. In near infrared spectroscopy, the TOF method is used to measure the media-dependent optical path length over a range of optical wavelengths, from which composition and properties of the media can be analyzed. In ultrasonic flow meter measurement, TOF is used to measure speed of signal propagation upstream and downstream of flow of a media, in order to estimate total flow velocity. This measurement is made in a collinear direction with the flow.

In planar Doppler velocimetry (optical flow meter measurement), TOF measurements are made perpendicular to the flow by timing when individual particles cross two or more locations along the flow (collinear measurements would require generally high flow velocities and extremely narrow-band optical filters). In optical interferometry, the path length difference between sample and reference arms can be measured by TOF methods, such as frequency modulation followed by phase shift measurement or cross correlation of signals. Such methods are used in laser radar and laser tracker systems for medium-long range distance measurement. In kinematics, TOF is the duration in which a projectile is traveling through the air. Given the initial velocity u of a particle launched from the ground, the downward (i.e., gravitational) acceleration and the projectile's angle of projection.

An ultrasonic flow meter measures the velocity of a liquid or gas through a pipe using acoustic sensors. This has some advantages over other measurement techniques. The results are slightly affected by temperature, density or conductivity. Maintenance is inexpensive because there are no moving parts. Ultrasonic flow meters come in three different types: transmission (contrapropagating transit time) flow meters, reflection (Doppler) flowmeters, and open-channel flow meters. Transit time flow meters work by measuring the time difference between an ultrasonic pulse sent in the flow direction and an ultrasound pulse sent opposite the flow direction. Doppler flow meters measure the Doppler shift resulting in reflecting an ultrasonic beam off either small particles in the fluid, air bubbles in the fluid, or the flowing fluid's turbulence. Open channel flow meters measure upstream levels in front of flumes or weirs.

Optical time-of-flight sensors consist of two light beams projected into the medium (e.g., fluid or air) whose detection is either interrupted or instigated by the passage of small particles (which are assumed to be following the flow). This is not dissimilar from the optical beams used as safety devices in motorized garage doors or as triggers in alarm systems. The speed of the particles is calculated by knowing the spacing between the two beams. If there is only one detector, then the time difference can be measured via autocorrelation. If there are two detectors, one for each beam, then direction can also be known. Since the location of the beams is relatively easy to determine, the precision of the measurement depends primarily on how small the setup can be made. If the beams are too far apart, the flow could change substantially between them, thus the measurement becomes an average over that space. Moreover, multiple particles could reside between them at any given time, and this would corrupt the signal since the particles are indistinguishable. For such a sensor to provide valid data, it must be small relative to the scale of the flow and the seeding density.

Figure 11:
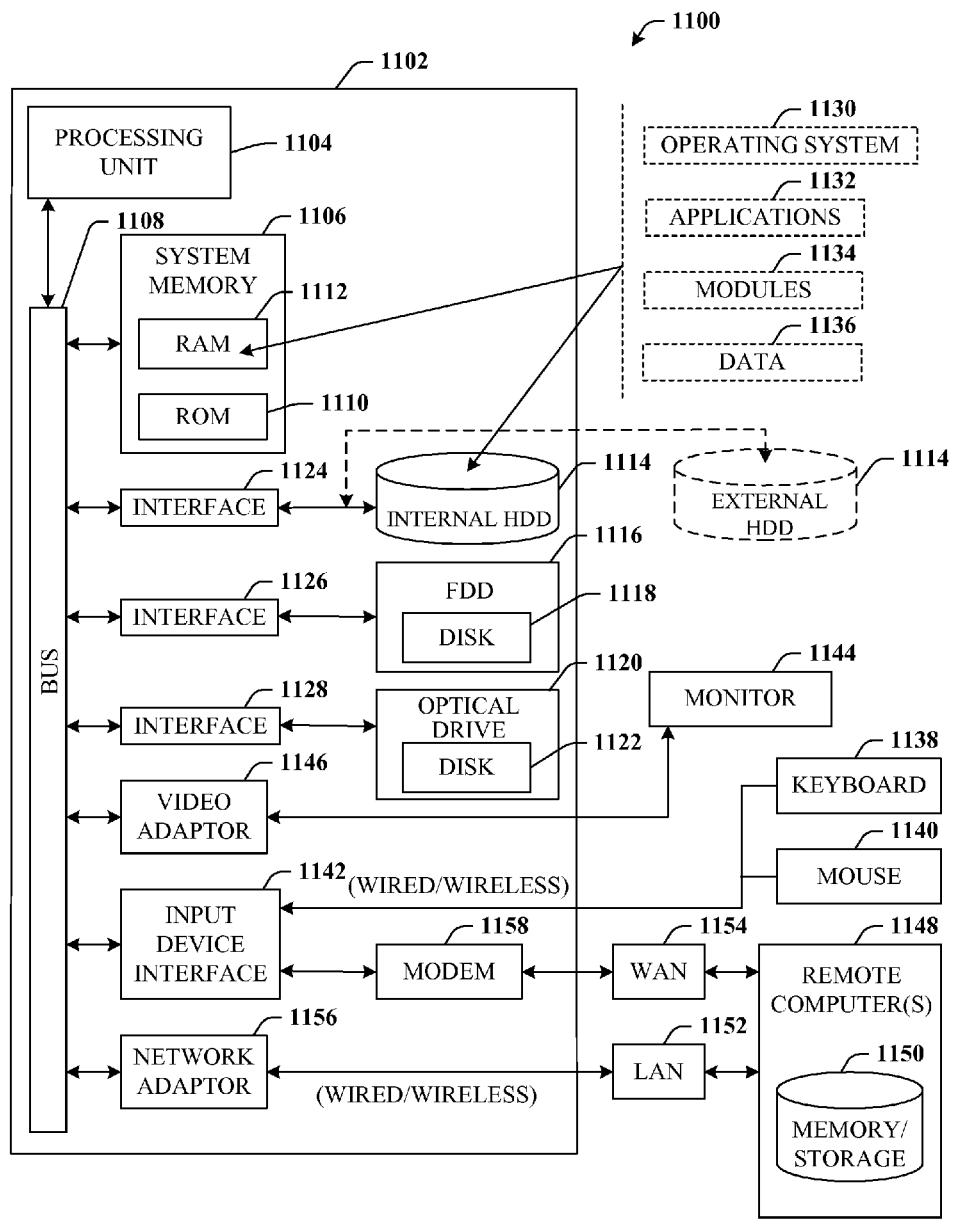
FIG. 11 is a block diagram depicting a computer operable to execute the disclosed system.

Referring now to FIG. 11, there is illustrated a block diagram of a computer operable to execute the disclosed system. In order to provide additional context for various aspects thereof, FIG. 11 and the following discussion are intended to provide a brief, general description of a suitable computing environment 1100 in which the various aspects of the claimed subject matter can be implemented. While the description above is in the general context of computer-executable instructions that may run on one or more computers, those skilled in the art will recognize that the subject matter as claimed also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer readable media. Computer readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 11, the illustrative environment 1100 for implementing various aspects includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1094 interface technologies. Other external drive connection technologies are within contemplation of the claimed subject matter.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the illustrative operating environment, and further, that any such media may contain computer-executable instructions for performing the methods of the disclosed and claimed subject matter.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is to be appreciated that the claimed subject matter can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1094 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adaptor 1156 may facilitate wired or wireless communication to the LAN 1152, which may also include a wireless access point disposed thereon for communicating with the wireless adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are illustrative and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10BaseT wired Ethernet networks used in many offices.

Figure 12:
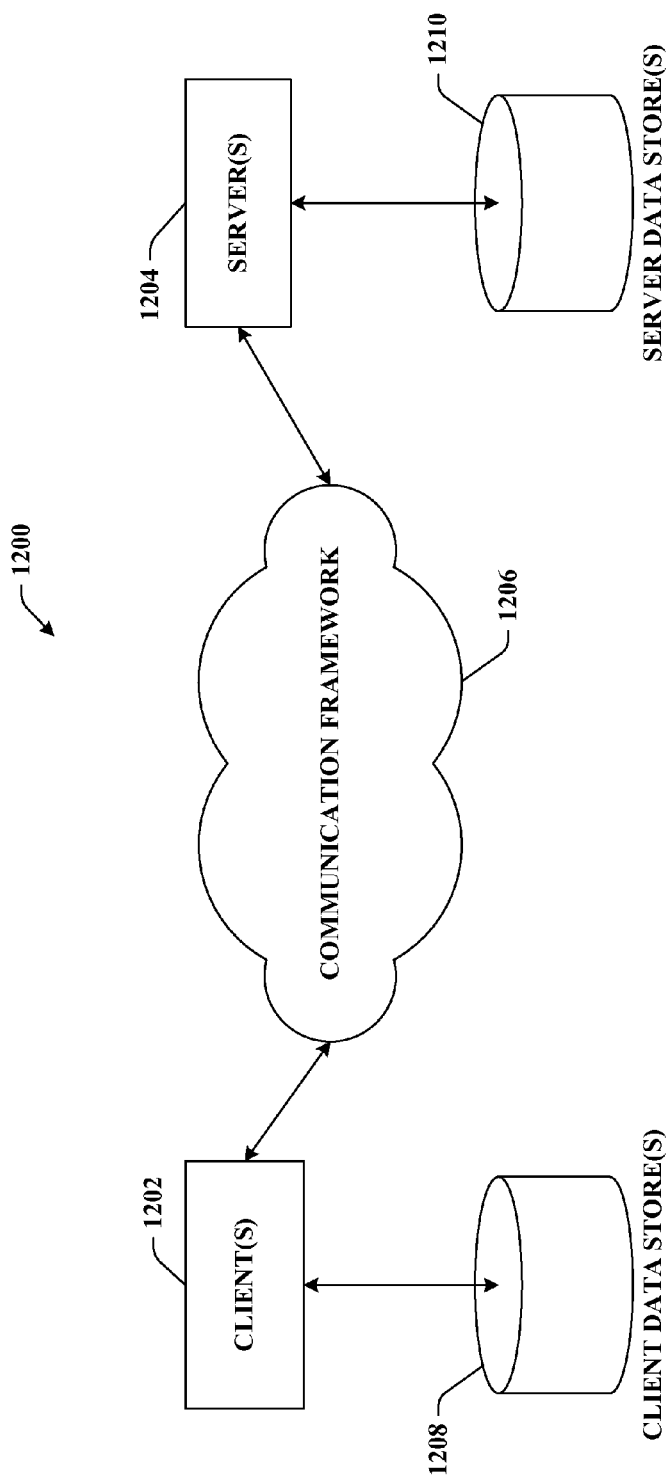
FIG. 12 is a schematic block diagram of an illustrative computing environment for processing the disclosed architecture in accordance with another aspect.

Referring now to FIG. 12, there is illustrated a schematic block diagram of an illustrative computing environment 1200 for processing the disclosed architecture in accordance with another aspect. The system 1200 includes one or more client(s) 1202. The client(s) 1202 can be hardware and/or software (e.g., threads, processes, computing devices). The client(s) 1202 can house cookie(s) and/or associated contextual information by employing the claimed subject matter, for example.

The system 1200 also includes one or more server(s) 1204. The server(s) 1204 can also be hardware and/or software (e.g., threads, processes, computing devices). The servers 1204 can house threads to perform transformations by employing the claimed subject matter, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

It is noted that as used in this application, terms such as "component," "module," "system," and the like are intended to refer to a computer-related, electro-mechanical entity or both, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process or thread of execution and a component may be localized on one computer or distributed between two or more computers, industrial controllers, or modules communicating therewith.

The subject matter as described above includes various exemplary aspects. However, it should be appreciated that it is not possible to describe every conceivable component or methodology for purposes of describing these aspects. One of ordinary skill in the art may recognize that further combinations or permutations may be possible. Various methodologies or architectures may be employed to implement the subject invention, modifications, variations, or equivalents thereof. Accordingly, all such implementations of the aspects described herein are intended to embrace the scope and spirit of subject claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. A method, comprising:
   determining, by a controller in communication with a time of flight sensor, a presence of a three-dimensional object entering into or exiting out of a target area based on an amount of light returned to the time of flight sensor exceeding a set threshold;
   determining, by the controller in communication with the time of flight sensor, a location of the three-dimensional object with respect to the target area, wherein detection limits of the time of flight sensor encompass a plurality of ranges between five millimeters and three-hundred meters;

determining, by the controller in communication with the time of flight sensor, a texture, a color, or a reflectivity of a surface of the three-dimensional object; and actuating, by the controller, an industrial machine operating within the target area based on the determination of the three-dimensional object entering into or exiting out of the target area, the location, and the texture, color, or reflectivity of the surface of the three-dimensional object.

2. The method of claim 1, wherein the target area is proximate to the time of flight sensor.

3. The method of claim 1, wherein the determining presence further comprises ascertaining whether the three-dimensional object has skirted outside a periphery of the target area.

4. The method of claim 1, wherein the time of flight sensor further comprises a multi pixel camera, and evaluating, by the controller in communication with the time of flight sensor, a sequence of images of the three-dimensional object obtained by the multi pixel camera to detect at least one edge of the three-dimensional object.

5. The method of claim 4, further comprising obtaining, by the multi pixel camera, the sequences of images over a continuous period of time.

6. The method of claim 1, wherein the determining presence further comprises detecting a movement of the three-dimensional object situated outside the target area.

7. The method of claim 4, wherein the evaluating further comprises comparing at least two adjacent pixels in the sequence of images.

8. The method of claim 7, further comprising suppressing a reflective background in the sequence of images.

9. A system, comprising:

a controller communicatively couple to a time of flight sensor configured to:

determine a presence of a three-dimensional object entering into or exiting out of a target area based on an amount of light returned to the time of flight sensor exceeding a set threshold;

detect a location of a three-dimensional object with respect to the target area, wherein detection limits of the time of flight sensor encompass a plurality of ranges between five millimeters and three-hundred meters; and determine a texture, a color, or a reflectivity of a surface of the three-dimensional object; and actuate an industrial equipment operating within the target area based on the determination of the three-dimensional object entering into or exiting out of the target area, the location, and the texture, color, or reflectivity of the surface of the three-dimensional object.

10. A non-transitory computer-readable medium having instructions stored thereon that, in response to execution, cause a controller in communication with a time of flight sensor to perform operations comprising:

determining a presence of a three-dimensional object entering into or exiting out of a target area based on an amount of light returned to the time of flight sensor exceeding a set threshold;

identifying a location of a three-dimensional object with respect to a target area, wherein detection limits of the time of flight sensor encompass a plurality of ranges between five millimeters and three-hundred meters; and determining a texture, a color, or a reflectivity of a surface of the three-dimensional object; and actuating an industrial device operating within the target area based on the determination of the three-dimensional object entering into or exiting out of the target area, the location, and the texture, color, or reflectivity of the surface of the three-dimensional object.

* * * * *